United States Patent [19]

Daransky et al.

[11] 4,298,019
[45] Nov. 3, 1981

[54] METHOD AND SYSTEM FOR CONTROLLING THE FLUID LEVEL IN A DRAIN TANK

[75] Inventors: Thomas E. Daransky; John D. Dickinson, both of Springfield, Pa.

[73] Assignee: Westinghouse Electric Corp., Pittsburgh, Pa.

[21] Appl. No.: 107,799

[22] Filed: Dec. 27, 1979

[51] Int. Cl.³ .......................... G05D 7/03; G05D 9/04
[52] U.S. Cl. ......................................... 137/9; 60/653; 60/679; 60/680; 137/118; 137/398
[58] Field of Search ...................... 60/653, 679, 680; 137/9, 11, 395, 398, 115, 118

[56] References Cited

U.S. PATENT DOCUMENTS

| | | | |
|---|---|---|---|
| 2,467,951 | 4/1949 | Whitley | 137/118 X |
| 3,053,521 | 9/1962 | Plaster | 137/115 X |
| 3,219,051 | 11/1965 | Francis | 137/118 |
| 3,322,136 | 5/1967 | Matta | 137/118 |
| 3,518,830 | 7/1970 | Viscovich | 60/679 X |

Primary Examiner—Robert G. Nilson
Attorney, Agent, or Firm—F. J. Baehr, Jr.

[57] ABSTRACT

A method and system for allocating fluid flow draining from a fluid utilizing apparatus to first and second fluid sinks. The fluid flow is entirely routed to the first fluid sink for drain flow rates less than a predetermined flow rate and to the second fluid sink as well as the first fluid sink for drain flow rates at least as great as the predetermined flow rate. Fluid from the fluid utilizing device is received in a drain tank through an inlet port and is drained therefrom through an outlet port. The fluid flow rate through the outlet port is regulated by cooperatively modulating first and second valves arranged in parallel flow relation to allocate fluid flow to the first and second fluid sinks.

5 Claims, 1 Drawing Figure

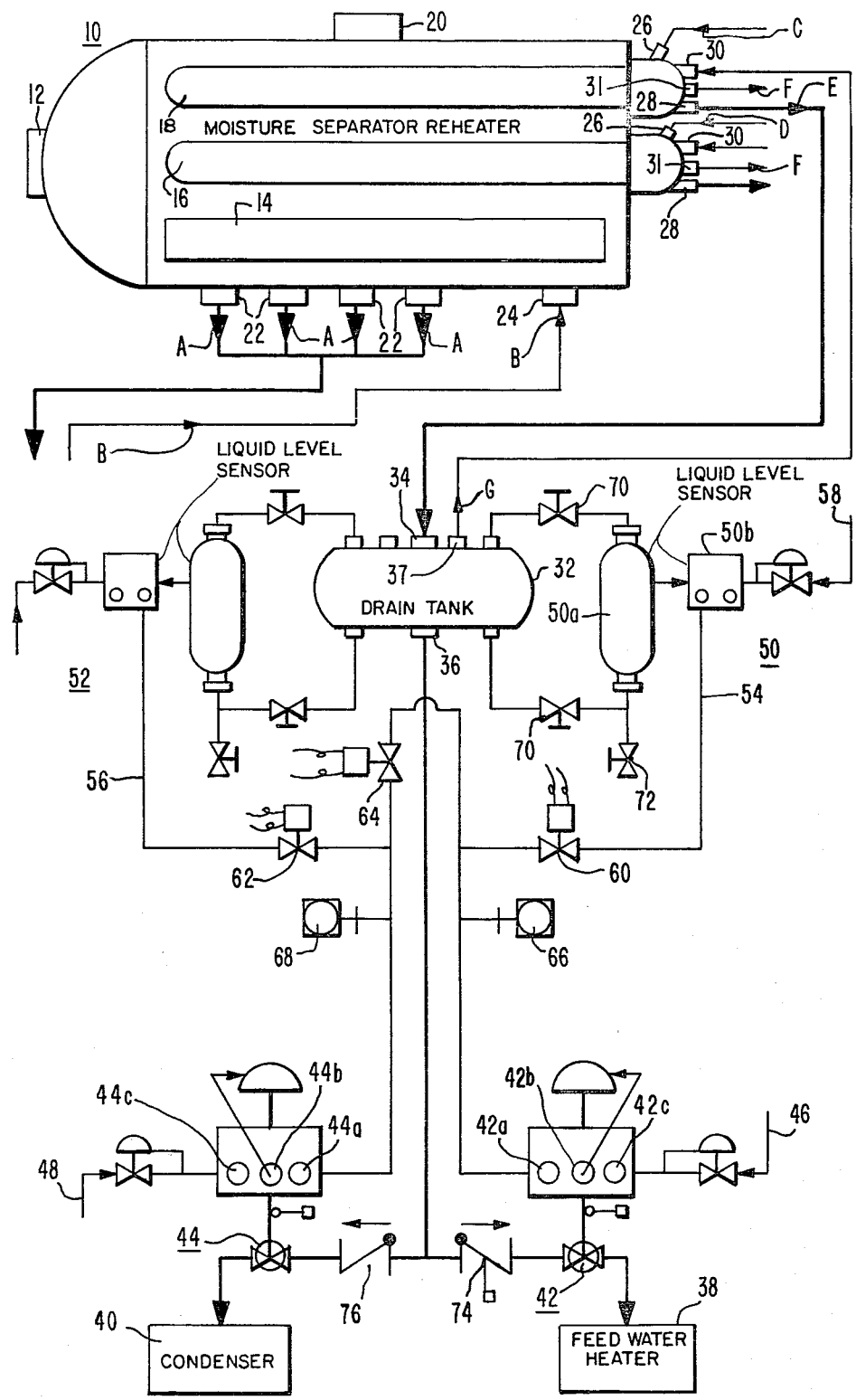

METHOD AND SYSTEM FOR CONTROLLING THE FLUID LEVEL IN A DRAIN TANK

BACKGROUND OF THE INVENTION

1. Field of the Invention

This invention relates to controlling fluid flow rates to two separate fluid sinks, and more particularly, to means and method for controlling the flow rate of condensate to a feedwater heater and main condenser in a heat/power conversion cycle.

2. Description of the Prior Art

Large central station power generation facilities typically utilize heat-power cycles in which a working fluid such as water is vaporized, expanded through a power turbine coupled to an electrical generator, condensed at the exhaust from the turbine in a condenser, and pressurized prior to vaporizing it again. At each of many locations in the heat-power cycle condensed water is routed to a heat-recovery device such as a feedwater heater. In some cases, however, when the flow rate of the condensate became excessive or the receiving feedwater heater was out of service, the excess condensate was often routed to other fluid utilizing devices such as other feedwater heaters of the condenser which can accept the additional, excess flow without adverse operational consequences.

For power cycles having controlled nuclear fission as the heat source, moisture separator reheater apparatus are commonly used to remove water from steam which has been partially expanded through the power turbine. The partially expanded steam is removed from one section of the turbine, transmitted through moisture separators which extract moisture from the steam, passed across the outside tube surfaces of a reheating tube bundle(s) to be reheated, and returned to a lower pressure section of the turbine. Higher temperature, reheating steam taken from a steam generator or other source is routed through the tubes of such reheating tube bundle(s) where it gives up a portion of its heat to the partially expanded steam and condenses. The partially expanded steam flowing on the outside of the reheating tube bundle(s) is reheated by the condensing, higher temperature steam circulated through the tubes of such tube bundle(s). When, multiple reheating tube bundles are used to reheat the partially expanded steam in stages to maximize the thermodynamic efficiency of the reheating process, each bundle is supplied with steam at a temperature different from the temperature supplied to other bundles. Each bundle is characterized by the steam temperature supplied to it with the progressively higher temperature tube bundles being arranged in the reheated steam's normal flow direction through the shell.

Condensate from the tube side of each tube bundle and the separated moisture from the partially expanded steam is removed from the tube side and shell side, respectively, and drained to a common or separate fluid sink(s) such as a feedwater heater(s) or condenser. Thermodynamically, it is most desirable to cascade any elevated temperature fluid to cycle heat recovery apparatus such as a feedwater heater rather than a cycle heat rejecting apparatus such as a condenser since retention of heat within the cycle increases the cycle's efficiency and reduces its operating cost. Thus, it is desirable to transmit the maximum possible percentage of condensate flow to heat recovery devices such as feedwater heaters. However, such heat recovery devices can typically accommodate limited flow rates before their performance is adversely affected. In cases of excess condensate flow and in cases where the heat recovery devices are out-of-service, the flow must be routed to less efficient heat recovery or heat rejection devices.

To facilitate control of condensate drainage from tube bundles, moisture separators, or other sources, the condensate is commonly routed through a relatively small drain tank. After steady state flow is achieved, increased condensate flow rates are reflected in increasing fluid heights in the drain tank. A signal indicative of the fluid level in the drain tank has typically been generated by a first controller apparatus and that signal has actuated a modulating valve to cause it to regulate the fluid flow rate from the drain tank. As the level in the drain tank increased above a desired, normal level, a first modulating valve for regulating fluid flow to the most efficient fluid sink continued to open as a result of the signal's level indication.

When the fluid flow rate to the drain tank surpassed the maximum flow rate transmissible by the first valve in its unrestricted flow position, the level in the drain tank continued to rise until a designated high level was reached. At such time, a second controller generated a signal which was trasmitted to a second modulating valve to cause it to open until the drain tank fluid level was reduced below the designated high level. Use of such separate full-range level controllers on horizontal, small diameter drain tanks occasionally presented difficulties when the separation between the normal and high fluid levels was insufficient. As a result of such insufficient level separation, the two level controllers interacted in modulating their respective valves and caused control system instability. Furthermore, failure of the first full-range controller caused all flow to be routed through the second modulating valve and thus reduced the efficiency of the power cycle. Failure of the second full-range controller necessitated the routing of all condensate through the first modulating valve. If, during exclusive condensate routing through the first valve, the condensate flow increased beyond the flow rate transmissible through the first valve, a costly and time-consuming shutdown of the entire power generation cycle would have been necessary to avoid consequences resulting from condensate backup into the moisture separator reheaters.

The aforementioned controller interaction problem was overcome by utilizing a split-range controller to sequentially open the first and second modulating valves by generating and transmitting a signal indicative of the drain tank's level to both modulating valves. The second valve was designed to respond to signals indicative of fluid levels greater than the designated high level. Such control system eliminated the interaction problem previously described, but provided no redundancy in the case of controller failure. Failure of such split-range controller may have necessitated the aforementioned unscheduled shutdown of the entire power generation cycle.

Desirable condensate drainage control system features include redundant, non-interacting controllers, sequential condensate distribution to two fluid sinks, and remote or automatic switching capability between first and second non-interacting controllers. Such features were not concurrently available on any prior art condensate drainage control system.

SUMMARY OF THE INVENTION

In general, a control system for distributing fluid flow to two fluid sinks from a fluid utilizing apparatus has a drain tank for collecting and transmitting fluid received from the fluid utilizing apparatus, two means for generating signals indicative of the fluid level in the drain tank, first and second valves in parallel flow relationship for regulating fluid flow rates to the two fluid sinks from the drain tank with the first valve being responsive to signals indicative of fluid levels less than a predetermined height and the second valve being responsive to signals indicative of fluid levels at least as high as the predetermined level, means for monitoring signals generated by both signal generators, and means for selectively communicating each generated signal to either, both, or neither valve. The signal communicating means preferably constitutes a first means for selectively obstructing signal transmission from the first signal generator to the first valve, second means for selectively obstructing signal transmission from the second signal generator to the second valve, and third means for selectively obstructing signal transmission from the first signal generator to the second valve and from the second signal generator to the first valve.

Additionally, a method for distributing fluid flow to two fluid sinks from a fluid utilizing apparatus when practiced in accordance with the present invention includes receiving fluid in a drain tank from the fluid utilizing apparatus, generating first and second signals which are each indicative of the fluid level in the drain tank, transmitting the first and second signals to first and second valves, respectively, adjusting the first valve in response to the signal transmitted to it when the signal is indicative of a drain tank fluid level less than a predetermined height, adjusting the second valve in response to the signal transmitted to it when the signal is indicative of a drain tank fluid level at least as great as the predetermined height, monitoring the first and second signals, obstructing transmission of the first signal to the first valve when the first signal is out of a predetermined range, obstructing transmission of the second signal to the second valve when the second signal is out of the predetermined range, transmitting the second signal to the first valve when the first signal is out of the predetermined range, and transmitting the first signal to the second valve when the second signal is out of the predetermined range. In accordance with the present invention the response of both valves to increasing fluid level signals constitutes increasing the flow rates through the valves.

BRIEF DESCRIPTION OF THE DRAWING

The objects and advantages of this invention will become more apparent from reading the following detailed description in connection with the accompanying drawings, in which:

Sole FIGURE in a schematic view of a portion of a heat/power generation cycle incorporating the present invention.

DESCRIPTION OF THE PREFERRED EMBODIMENT

Referring now to the drawing in detail, the sole FIGURE is a schematic view of a control system for regulating condensate flow from a moisture separator reheater tube bundle to two condensate sinks. While the present apparatus and method inventions can be applied to any fluid utilizing apparatus, moisture separator reheater structure 10 is illustrated since multiple drain controls are necessary for each moisture separator reheater and since precise control of the condensate drainage is particularly critical for nuclear heat source power generation cycles having moisture separator reheaters.

Steam in a nuclear heat source power cycle is expanded through a section of a turbine prior to being extracted therefrom and routed to shell inlet nozzle 12. The extracted, partially expanded steam is moisture laden and is usually sequentially passed through a moisture separator 14 which, by example, constitutes chevrons, across a low pressure reheater tube bundle 16, across a high pressure reheater tube bundle 18, and out of the moisture separator reheater through shell outlet nozzle 20. The steam exiting outlet nozzle 20 is returned to the turbine for further expansion therethrough in a dry and reheated state. Moisture separated from the steam in moisture separator 14 is drained from the moisture separator reheater shell through drain nozzles 22 in the direction indicated by arrows A. Vapors are removed from a moisture separator reheater shell drain tank 32 (a similar or identical high pressure tube bundle drain tank 32 is described later) into shell vent nozzle 24 in the direction indicated by arrow B. Relatively low temperature heating steam is provided to the tube side of low pressure reheater bundle 16 through inlet nozzle 26. The heating steam supplied to the low pressure tube bundle 16 typically constitutes extraction steam from a high pressure section of the turbine. Relatively high temperature heating steam typically emanating upstream from the turbine's throttle valves is supplied to the tube side of high pressure reheater tube bundle 18 through inlet nozzle 26 in the direction of arrow C. The low and high temperature heating steam entering inlet nozzles 26 partially condenses while giving up much of its heat through the tubes to the partially expanded steam flowing through the shell side of the moisture separator reheater. The condensate forming on the tube side is removed from the low pressure and high pressure tube bundles through drain nozzles 28. The condensate-steam mixture and non-condensible substances respectively exit high pressure reheater tube bundle 18 through outlet nozzle 28 and vent nozzle 31 in the directions respectively represented by arrows E and F. Low pressure reheater tube bundle 16, when used in combination with high pressure reheater tube bundle 18, increases the efficiency of the reheating process. However, for purposes of the present invention, only a single tube bundle need be utilized.

Drainage of the condensate is illustrated only for the high pressure reheater tube bundles 18, but it is to be understood that the condensate drainage control systems for the low pressure reheater tube bundle 16 and moisture separator 14 are very similar to the illustrated system and are not shown for the sake of simplicity and clarity. It is to be further understood that while a double tube bundle (low pressure and high pressure) moisture separator reheater 10 is illustrated, any fluid utilizing device such as a feedwater heater can be used with the present invention.

From a thermodynamic standpoint it is most efficient to route the condensate exiting outlet nozzles 28 to a fluid sink or other fluid utilizing apparatus designed to recover and use heat to improve cycle efficiency. However, fluid utilizing devices such as feedwater heaters can typically accommodate limited flow before their functions are adversely affected. If the condensate flow rate becomes larger than such feedwater heaters can accommodate or the feedwater heaters are out of service, the unaccommodatable condensate flow must be routed to a less efficient fluid utilizing device such as a heat rejection condenser.

Reheater drain tank 32 is provided for receiving the condensate flow through inlet port 34, accumulating a predetermined quantity thereof, and transmitting the condensate through outlet port 36. Vapors are removed from drain tank 32 through vent nozzle 37 and are cascaded in the direction of arrow G through head vent nozzle 30. Condensate flow leaving outlet port 36 is distributed between a first, optimum heat sink 38 such as a feedwater heater and a second, main condenser 40 which acts as the cycle's heat rejection apparatus. First and second modulating valve apparatus 42 and 44 are in parallel flow relationship to regulate condensate flow to feedwater heater 38 and condenser 40, respectively from drain tank outlet port 36. A control air signal (which by example varies between 6 and 30 psi) is received by valve control portions 42a and 44a. The received air signal indirectly imparts displacement of diaphragm valve portions 42b and 44b by controlling supply air exposure thereto through valve supply portions 42c and 44c. Supply air is furnished to valve supply portions 42c and 44c through supply air lines 46 and 48, respectively, at pressures between 60 and 100 psi by example. Vale 42 is responsive to control air pressure signals between approximately 6 and 18 psi by example and valve 44 is responsive to control air pressure signals between 18 and 30 psi by example. In other words, diaphragm portions 42b and 44b, respectively, modulate in a sequential manner such that valve 42 opens increasing amounts as the pressure signal increases to 18 psi where the valve 42 is fully open while valve 44 does not begin to open until a pressure signal of 18 psi is received. Valve 44 continues to open as the pressure signal supplied thereto is increased to 30 psi at which point valve 44 is fully open.

First and second signal generators such as controllers 50 and 52 normally supply air to control air valve portions 42a and 44a, respectively, through control signal lines 54 and 56, respectively. For the sake of simplicity since the controllers are essentially identical, controller 50, alone, will be described. Level sensor 50a detects the condensate level in drain tank 32 causing controller pressure regulating portion 50b to regulate the pressure of supply air provided through supply line 58 and generate a control air signal which is transmitted through control signal line 54. Typical supply air pressure falls in the range of 60 to 100 psi and the generated control signal falls within the range of 6 to 30 psi by example.

First and second signal obstructing means such as signal isolation valves 60 and 62 are respectively disposed in control signal lines 54 and 56 between controller 50 and valve 42 and between controller 52 and valve 44. Third signal obstructing means such as signal separation valve 64 for preventing signal communication between control signal lines 54 and 56 downstream from signal isolation valves 60 and 62 permits signals generated by either controller to be transmitted to both valves. During normal control system operation, isolation valves 60 and 62 are open in the unobstructing signal position to allow signals generated by controllers 50 and 52 to be respectively transmitted while separation valve 64 is in the closed, signal obstructing position to prevent signal mixing and cross-communication between controller 50 and flow valve 44 as well as between controller 52 and flow valve 42. Although the signals generated by controllers 50 and 52 are identical, or substantially so, complete opening of vale 42 preferably precedes the opening of valve 44. Such is made possible by including appropriate biasing means such as a spring in valve 44 which does not permit valve opening until a sufficiently high pressure air signal is generated and transmitted thereto. The opening of valve 44 is initiated after valve 42 has been completely opened so as to direct the maximum condensate flow rate which can be accommodated to feedwater heater 38. Valve 42 is, of course, unresponsive to opening signals greater than the signal corresponding to the wide open position for valve 42. Although identical signals are transmitted from controllers 50 and 52 to valves 42 and 44, respectively, valve 42 is responsive to one range of signals while valve 44 is reponsive to a different, higher range of signals.

Air signal pressure switches 66 and 68 constitute means for monitoring the air pressure signals in lines 54 and 56. If the pressure switch 66 indicates a signal out of a predetermined range (such as less than 6 or more than 30 psi) signal isolation valve 60 would be closed to obstruct the erroneous signal generated by controller 50 and signal separation valve 64 would be opened to provide signal communication from controller 52 to valves 42 and 44. Since controllers 52 and 50 generate identical signals when both are functioning properly, the signal transmitted to valve 42 by controller 52 is identical to what would be trasmitted to valve 42 by controller 50 under normal circumstances. If an erroneous signal is monitored by pressure switch 68, signal isolation valve 62 is closed while signal separation valve 64 is opened so as to communicate the signal generated by controller 50 to valves 42 and 44. The control system's capability to selectively communicate the signals to separate valves during normal operation, and communicate either signal to both valves while obstructing communication of the remaining signal to either valve in the case of a controller failure ensures maintenance of a continuous, precise condensate flow allocation to feedwater heater 38 and condenser 40.

Level sensor 50a typically constitutes a float mechanism which induces signal regulation portion 50b to generate an air signal indicative of the condensate level in the drain tank 32. Condensate isolation valves 70 permit fluid isolation of controller 50 from the reheater drain tank 32 so as to simplify repair or replacement thereof while continously operating moisture separator reheater 10. Drain valve 72 permits drainage of level sensor 50a and associated piping to facilitate maintenance thereon. Check valves 74 and 76 are disposed in parallel flow relationship downstream from drain tank 32 and in series flow relationship with flow modulating valves 42 and 44, respectively, to prevent condensate flow reversal under any condition through the low and high pressure reheater tube bundles 16 and 18.

As can be seen a method and apparatus for distributing condensate flow to two fluid sinks has been provided in which redundant control signals transmitted to the flow modulating valves enables either signal generator (controller) to function in combination with the two flow modulating valves, split-range controllers avoid interaction and instability problems associated with redundant full-range controllers, optimum rates of condensate drainage are distributed to feedwater heater 38 and main condenser 40, and means are provided for selectively communicating signals generated by either controller to one, two, or neither of the signal responsive flow modulating valves. While the present invention is illustrated as utilizing pneumatic signals, it is to be understood that the same invention could be utilized with flow modulating valves which are actuatable by electrical signals which are proportional to the condensate level of the drain tank, and are selectively communicable to the various flow modulating valves.

We claim:

1. A control system for regulating the fluid flow rates to two fluid sinks from a fluid utilizing apparatus, said control system comprising:

a drain tank having an inlet port in fluid communication with the fluid utilizing apparatus and an outlet port;

first and second means for respectively generating first and second signals each of which is indicative of the fluid level in said drain tank;

first and second valves in parallel flow relationship for regulating the flow rate of fluid flowing from said drain tank's outlet port to each of the fluid sinks in response to said signals, said second valve being responsive to relatively higher fluid level signals than said first valve;

means for monitoring the first and second signals; and means for communicating each signal to selected valves;

said communication means comprising:

first and second means for selectively obstructing transmission of said first and second signals to said first and second valves, respectively; and third means for selectively obstructing transmission of said first signal to said second valve and said second signal to said first valve.

2. The control system of claim 1 wherein said second valve is responsive to signals indicative of fluid levels at least as great as a predetermined height.

3. The control system of claim 2 wherein said first valve is responsive to signals indicative of fluid levels less than said predetermined height.

4. The control system of claim 1 wherein said first and second valves' responses to increasing fluid levels constitute increasing the flow rates therethrough.

5. A method for regulating the fluid flow rates to two fluid sinks from a fluid utilizing apparatus, said method comprising:

receiving fluid from the fluid utilizing apparatus through an inlet port in a drain tank;

generating first and second signals each of which is indicative of the fluid level in the drain tank;

transmitting said first and second signals to a first and second valve, respectively;

modulating said first valve to provide fluid flow through an outlet port in the drain tank to a first fluid sink and maintain a desired fluid level in said drain tank in response to said signal transmitted thereto when said signal is indicative of a fluid level less than a predetermined height;

modulating said second valve to provide fluid flow to a second fluid sink in response to said signal transmitted thereto when said signal is indicative of a fluid level as least as great as said predetermined height;

monitoring said first and second signals;

obstructing said first signal transmission to said first valve when said first signal is out of a predetermined range;

obstructing said second signal transmission to said second valve when said second signal is out of said predetermined range;

transmitting said second signal to said first valve when said first signal is out of said predetermined range; and transmitting said first signal to said second valve when said second signal is out of said predetermined range.

* * * * *